(12) United States Patent
Lee et al.

(10) Patent No.: US 7,914,660 B2
(45) Date of Patent: Mar. 29, 2011

(54) METHOD OF CONTROLLING PH OF ELECTROLYZED SOLUTION USING MICROFLUIDIC DEVICE INCLUDING ELECTROLYSIS DEVICE

(75) Inventors: Hun-joo Lee, Seoul (KR); Joon-ho Kim, Seongnam-si (KR); Chang-eun Yoo, Seoul (KR); Kyu-youn Hwang, Incheon-si (KR); Hee-kyun Lim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1293 days.

(21) Appl. No.: 11/303,673

(22) Filed: Dec. 16, 2005

(65) Prior Publication Data
US 2006/0169598 A1    Aug. 3, 2006

(30) Foreign Application Priority Data
Dec. 17, 2004    (KR) ................. 10-2004-0108035

(51) Int. Cl.
*C25B 1/10*    (2006.01)
(52) U.S. Cl. ................. 205/629; 205/628; 205/755
(58) Field of Classification Search .......... 205/628, 205/629, 755
See application file for complete search history.

(56) References Cited

U.S. PATENT DOCUMENTS
5,162,077 A    11/1992    Bryan et al.

FOREIGN PATENT DOCUMENTS
DE    1061096    11/1956
DE    3217987 A1    11/1983
EP    0637381 B1    9/1996

OTHER PUBLICATIONS
European Search Report dated Dec. 29, 2008 for Application No. 05025575.1-1239/1672459.

*Primary Examiner* — Alexa D. Neckel
*Assistant Examiner* — Nicholas A. Smith
(74) *Attorney, Agent, or Firm* — Cantor Colburn LLP

(57) ABSTRACT

Provided is a method of controlling the pH of a solution using electrolysis in a microfluidic device comprising an electrolysis device including an anode chamber, a cathode chamber, and a partition membrane between the anode chamber and the cathode chamber, wherein the anode chamber includes an inlet and an outlet through which an anode chamber solution enters and is discharged from the anode chamber, respectively, and an electrode, and the cathode chamber includes an inlet and an outlet through which a cathode chamber solution enters and is discharged from the cathode chamber, respectively, and an electrode. The method includes: flowing the anode chamber solution containing a compound having a lower standard oxidation potential than water into the anode chamber through the inlet of the anode chamber; flowing the cathode chamber solution containing a compound having a lower standard reduction potential than water into the cathode chamber through the inlet of the cathode chamber; applying voltage between the electrode in the anode chamber and the electrode in the cathode chamber to induce electrolysis in the anode chamber and the cathode chamber; and mixing equal volumes of the acidic anode-electrolyzed solution and the basic cathode-electrolyzed solution, wherein the volumes of the cathode chamber and the anode chamber are controlled in a predetermined ratio according to a target pH of a solution obtained by mixing the acidic anode-electrolyzed solution and the basic cathode-electrolyzed solution.

6 Claims, 3 Drawing Sheets

METHOD OF CONTROLLING PH OF ELECTROLYZED SOLUTION USING MICROFLUIDIC DEVICE INCLUDING ELECTROLYSIS DEVICE

This application claims the priority of Korean Patent Application No. 10-2004-0108035, filed on Dec. 17, 2004, in the Korean Intellectual Property Office, the disclosure of which is incorporated herein in its entirety by reference.

BACKGROUND OF THE INVENTION

1. Field of the Invention

The present invention relates to a method of controlling the pH of a solution using a microfluidic device including an electrolysis device.

2. Description of the Related Art

Microfluidic devices refer to devices in which an inlet, an outlet, a reaction chamber, etc., are interconnected through microchannels. Such devices are widely known in the field and are used in micro-analytic devices, such as a lab-on-a-chip (LOC). In addition to microchannels, a micropump for inducing the flow of fluid, a micromixer for mixing fluids, a microfilter for filtering a fluid, etc., are included in microfluidic devices.

A microfluidic device used as a biological analytic device, such as a LOC, performs a series of biological analytic processes, such as cytolysis, nucleic acid amplification and separation, such as polymerase chain reaction (PCR), and protein separation and detection. A conventional pH control process involved in such biological analysis processes is achieved by adding or removing an acidic solution, a neutral solution, or a buffer solution. However, when adding or removing a pH-adjusting solution in a microfluidic device, problems associated with dilution, mixing and the flow of a substance in a microchannel may arise because a small amount of sample is used. Furthermore, the added pH-adjusting material may inhibit subsequent biological analysis processes. In this case, the pH-adjusting material has to be removed.

However, a method of controlling pH in-situ while generating hydrogen ions and hydroxide ions through electrolysis and mixing the ions is still not disclosed.

However, the inventors of the present invention found a method of controlling pH using electrolysis in a microfluidic device, in which the volume ratio of anode and cathode chambers is controlled, and solutions generated in the anode and cathode chambers through electrolysis are mixed in the equal volumes, and completed the prevent invention.

SUMMARY OF THE INVENTION

The present invention provides a method of controlling pH using a microfluidic device including an electrolyzing device.

According to an aspect of the present invention, there is provided a method of controlling the pH of a solution using electrolysis in a microfluidic device comprising an electrolysis device including an anode chamber, a cathode chamber, and a partition membrane between the anode chamber and the cathode chamber, wherein the anode chamber includes an inlet and an outlet through which an anode chamber solution enters and is discharged from the anode chamber, respectively, and an electrode, and the cathode chamber includes an inlet and an outlet through which a cathode chamber solution enters and is discharged from the cathode chamber, respectively, and an electrode, the method comprising: flowing the anode chamber solution containing a compound having a lower standard oxidation potential than water into the anode chamber through the inlet of the anode chamber; flowing the cathode chamber solution containing a compound having a lower standard reduction potential than water into the cathode chamber through the inlet of the cathode chamber; applying a voltage between the electrode in the anode chamber and the electrode in the cathode chamber to induce electrolysis in the anode chamber and the cathode chamber thereby producing an acidic anode-electrolyzed solution and a basic cathode-electrolyzed solution; and mixing equal volumes of the acidic anode-electrolyzed solution and the basic cathode-electrolyzed solution, wherein the volumes of the cathode chamber and the anode chamber are controlled in a predetermined ratio according to a target pH of a solution obtained by mixing the acidic anode-electrolyzed solution and the basic cathode-electrolyzed solution.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
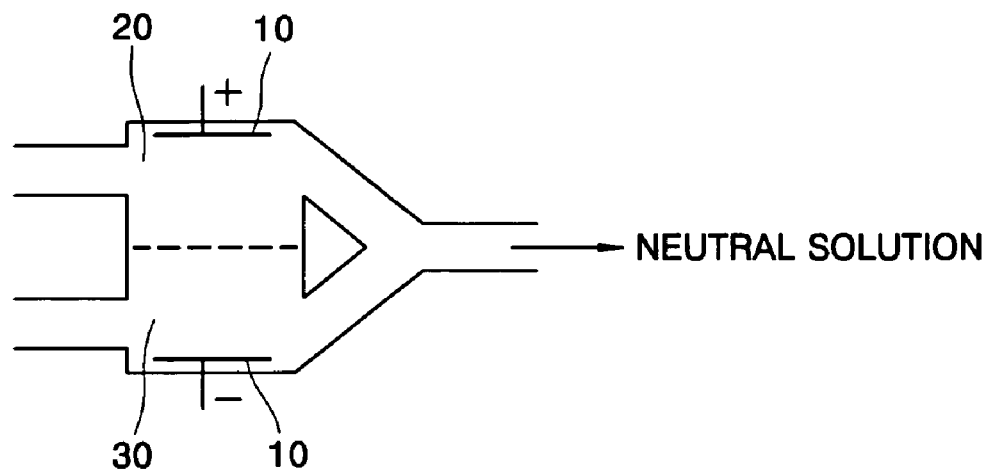
FIGS. 1A through 1C schematically illustrate the principle of a method of controlling pH according to an embodiment of the present invention.

A method of controlling pH according to an embodiment of the present invention uses electrolysis in a microfluidic device comprising an electrolysis device including an anode chamber, a cathode chamber, and a partition membrane between the anode chamber and the cathode chamber, wherein the anode chamber includes an inlet and an outlet through which an anode chamber solution enters and is discharged from the anode chamber, respectively, and an electrode, and the cathode chamber includes an inlet and an outlet through which a cathode chamber solution enters and is discharged from the cathode chamber, respectively, and an electrode. The method according to the present invention includes: flowing the anode chamber solution containing a compound having a lower standard oxidation potential than water into the anode chamber through the inlet of the anode chamber; flowing the cathode chamber solution containing a compound having a lower standard reduction potential than water into the cathode chamber through the inlet of the cathode chamber; applying a voltage between the electrode in the anode chamber and the electrode in the cathode chamber to induce electrolysis in the anode chamber and the cathode chamber thereby producing an acidic anode-electrolyzed solution and a basic cathode-electrolyzed solution; and mixing equal volumes of the acidic anode-electrolyzed solution and the basic cathode-electrolyzed solution, wherein the volumes of the cathode chamber and the anode chamber are controlled in a predetermined ratio according to a target pH of a solution obtained by mixing the acidic anode-electrolyzed solution and the basic cathode-electrolyzed solution.

The method according to the present invention includes (a) flowing an anode chamber solution containing a compound having a lower standard oxidation potential than water into the anode chamber through the inlet of the anode chamber and (b) flowing a cathode chamber solution containing a compound containing a cell or a virus and having a lower standard reduction potential than water into the cathode chamber through the inlet of the cathode chamber.

In the method described above, the compound having a lower standard oxidation potential than water may be, but is not limited to, a compound containing at least one kind of anions selected from the group consisting of $NO_3^-$, $F^-$, $SO_4^{2-}$, $PO_4^{3-}$, and $CO_3^{2-}$. The compound having a lower standard reduction potential than water may be, but is not limited to, a compound containing at least one kind of cations selected from the group consisting of $Na^+$, $K^+$, $Ca^{2+}$, $Mg^{2+}$, and $Al^{3+}$. In the above-described method, (a) and (b) may be simultaneously or sequentially performed.

In the electrolysis device used in the method according to the present invention, the partition membrane may pass current and block ions and gas generated as a result of the electrolysis of the electrolyzed solutions in the anode and cathode chambers. For example, the partition membrane may pass current, but do not pass hydrogen ions and hydroxide ions and/or gas. Examples of the partition membrane include, but are not limited to, Nafion™ (Dupont), Dowex™ (Aldrich), Diaion™ (Aldrich), etc.

The electrodes in the anode and cathode chambers of the electrolysis device used in the method according to the present invention may be formed of one of platinum, gold, copper, palladium, etc. When a platinum electrode is used in the anode chamber, the adsorption of protein and DNA can be prevented. When a copper electrode is used in the anode chamber, the copper electrode can form $CuCl_2$ through the reaction with chlorine ions included in, for example, NaCl, contained in the anode chamber, thereby suppressing the generation of toxic chlorine gas. In addition, when a palladium electrode is used, the palladium electrode absorbs hydrogen gas generated in the cathode chamber, and thus an additional degassing process is unnecessary.

The method according to the present invention may further include (c) applying a voltage across the electrodes in the anode chamber and the cathode chamber to induce electrolysis in the anode chamber and the cathode chamber. In the method according to the present invention, since a cathode chamber solution including the compound having a lower standard reduction potential than water is contained in the cathode chamber, hydrogen gas and hydroxide ions ($OH^-$) are generated in the cathode chamber as a result of the electrolysis of water. In addition, since an anode chamber solution including the compound having a lower standard reduction potential than water is contained in the anode chamber, oxygen gas and hydrogen ions ($H^+$) are generated in the anode chamber as a result of the electrolysis of water. Accordingly, the cathode chamber solution has an alkaline pH, and the anode chamber solution has an acidic pH.

In general, a biological analytic microfluidic device, such as a lab-on-a-chip, perform various biological analysis processes, such as cell lysis, PCR, nucleic acid separation, protein separation, etc. Most of such biological analysis processes are performed at a neutral pH because biological molecules, such as nucleic acids or proteins are stable in a neutral condition. In particular, a series of processes involving cell lysis, nucleic acid separation and amplification, protein separation and detection, etc., may be performed in a microfluidic device. In this case, a solution obtained as a result of the reaction in each of the processes must not include any substance affecting reaction in a subsequent process. This solution may have a neutral pH or a pH not affecting a subsequent reaction.

The method according to the present invention may include (d) mixing equal volumes of an acidic anode-electrolyzed solution (anode chamber solution) and a basic cathode-electrolyzed solution (cathode chamber solution), which are obtained as a result of the electrolysis in the anode and cathode chambers. The mixing the equal volumes of the electrolyzed solutions can be achieved, for example, using one pump, which is installed in a microchannel formed by merging an outlet microchannel of the anode chamber and an outlet microchannel of the cathode chamber. In this case, the equal volumes of the electrolyzed solutions can be mixed without measuring the volumes of the electrolyzed solutions flowing out through the outlet microchannels of the anode and cathode chambers. Thus, a flowmeter is not required. Alternatively, equal volumes of the electrolyzed solution flowing out through the outlet microchannel of the anode chamber and the electrolyzed solution flowing out through the outlet microchannel of the cathode chamber may be measured and then mixed. However, methods of mixing equal volumes of the electrolyzed solutions that can be used in the present invention are not limited to the methods described above.

In an embodiment of the electrolysis device included in the microfluidic device used in the method of the present invention, the electrolysis device further comprises a pump which is disposed in a microchannel formed by merging the outlet microchannel of the anode chamber and the outlet microchannel of the cathode chamber.

In the electrolysis device used in the method according to the present invention, the volumes of the cathode chamber and the anode chamber are determined in a predetermined ratio according to a target pH of a mixed solution of the anode-electrolyzed solution and the cathode-electrolyzed solution. In the method according to the present invention, a total equivalent of hydrogen ions generated in the anode chamber and a total equivalent of hydroxide ions generated in the cathode chamber are the same. Therefore, when a total amount of the anode chamber solution and a total amount of the cathode chamber solution are mixed together, an initial pH of a sample is obtained. In other words, there is no need to additionally adjust the pH of the sample for various processes. In the method of controlling pH according to the present invention, the volumes of the anode chamber and the cathode chamber are varied in a predetermined ratio to produce electrolyzed solutions having different ionic concentrations in the anode and cathode chambers so that the electrolyzed solutions in the anode and cathode chambers are mixed in the same volume to obtain a solution having a target pH.

Figure 1B:
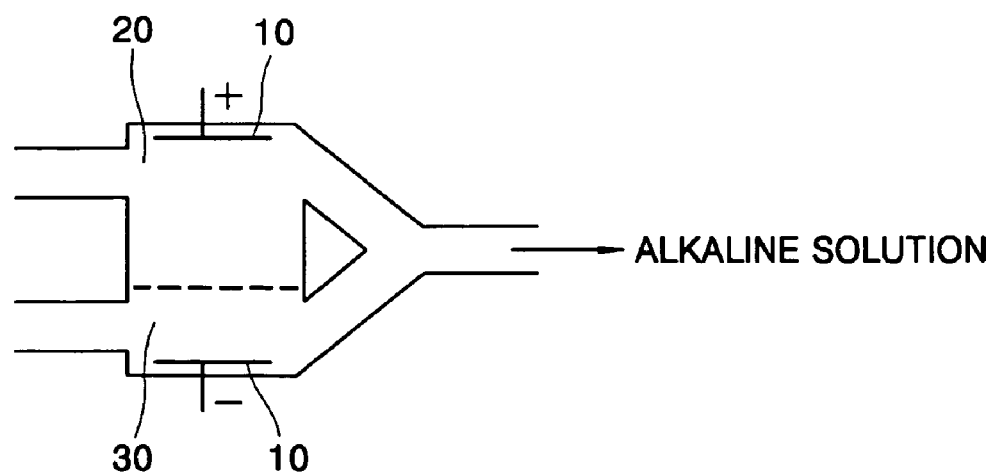
Figure 1C:
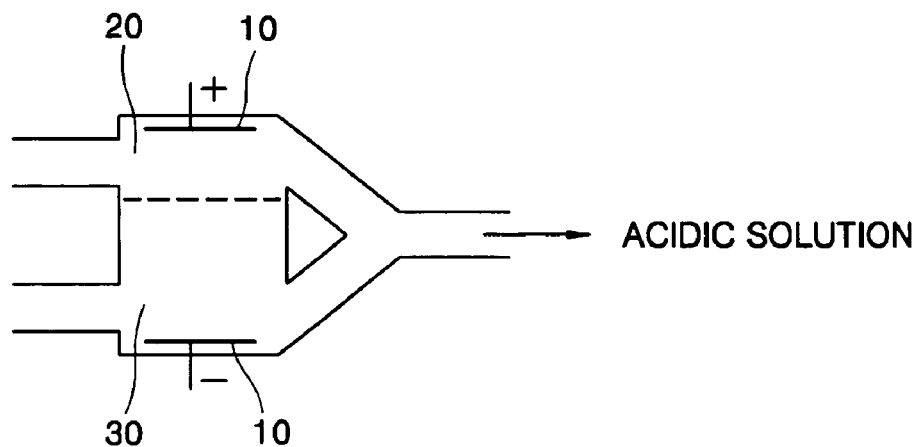

FIGS. 1A through 1C illustrate the principle of a method of controlling pH according to an embodiment of the present invention. Referring to FIG. 1A, when the volumes of an anode chamber 20 and a cathode chamber 30 are the same, after electrolysis is induced by supplying a voltage to electrodes 10 in the anode chamber 20 and the cathode chamber 30, a total equivalent of hydrogen ions generated in the anode chamber 20 is equal to a total equivalent of hydroxide ions generated in the cathode chamber 30. Therefore, when equal volumes of an anode chamber solution and a cathode chamber solution are mixed, the mixed solution has a neutral pH.

However, referring to FIG. 1B, when the volume of the anode chamber 20 is greater than the volume of the cathode chamber 30, the concentration of hydrogen ions generated in the anode chamber 20 is lower than the concentration of hydroxide ions generated in the cathode chamber 30. Therefore, when equal volumes of the anode chamber solution and the cathode chamber solution are mixed, the mixed solution has an alkaline pH. In addition, referring to FIG. 1C, when the volume of the cathode chamber 30 is greater than the volume of the anode chamber 20, the concentration of hydroxide ions generated in the cathode chamber 30 is lower than the concentration of hydrogen ions generated in the anode chamber 20. Therefore, when equal volumes of the anode chamber solution and the cathode chamber solution are mixed, the mixed solution has an acidic pH.

A target pH of the final mixed solution can be determined according to the concentrations of hydrogen ions and hydroxide ions generated in the anode and cathode chambers that are calculated with reference to the standard reduction potentials of electrolytic solutions in the anode and cathode chambers and the volumes of the anode and cathode chambers in a microfluidic device used in the method of the present invention. Alternatively, a target pH of the final mixed solution can be experimentally determined according to the method comprising; making a microfluidic device used in the method of the present invention including an electrolysis device having an anode chamber and a cathode chamber in a varying volume ratio between the anode chamber and the cathode chamber; flowing the anode chamber solution containing a compound having a lower standard oxidation potential than water into the anode chamber through the inlet of the anode chamber; flowing the cathode chamber solution containing a compound having a lower standard reduction potential than water into the cathode chamber through the inlet of the cathode chamber; applying a voltage between the electrode in the anode chamber and the electrode in the cathode chamber to induce electrolysis in the anode chamber and the cathode chamber; mixing equal volumes of the acidic anode-electrolyzed solution and the basic cathode-electrolyzed solution, and measuring the target pH of the final mixed solution. Thus, the target pH of the final mixed solution can be easily determined by one of ordinary skill in the art according to a selected electrolytic solution. In this way, the volume ratio between the anode chamber and the cathode chamber can be determined according to a target pH and a sample solution. The volume ratio of the anode chamber and the cathode chamber determined as described above can be used when manufacturing an electrolysis device to be used in the method according to the present invention in which a target pH can be achieved by just mixing equal volumes of the electrolyzed solution in the anode chamber and the electrolyzed solution in the cathode chamber.

Hereinafter, the present invention will be described in more detail with reference to the following examples. The following examples are for illustrative purposes only and are not intended to limit the scope of the present invention.

EXAMPLE 1 pH Control Based on the Volume Ratio of Anode Chamber to Cathode Chamber

In the current embodiment, electrolysis was performed using an electrolysis device including a cathode chamber, an anode chamber, and a partition membrane between the cathode chamber and the anode chamber. A cathode chamber solution and an anode chamber solution obtained as a result of the electrolysis were mixed in an equal volume using a pump. The pH of the mixed solution was measured.

Figure 2:
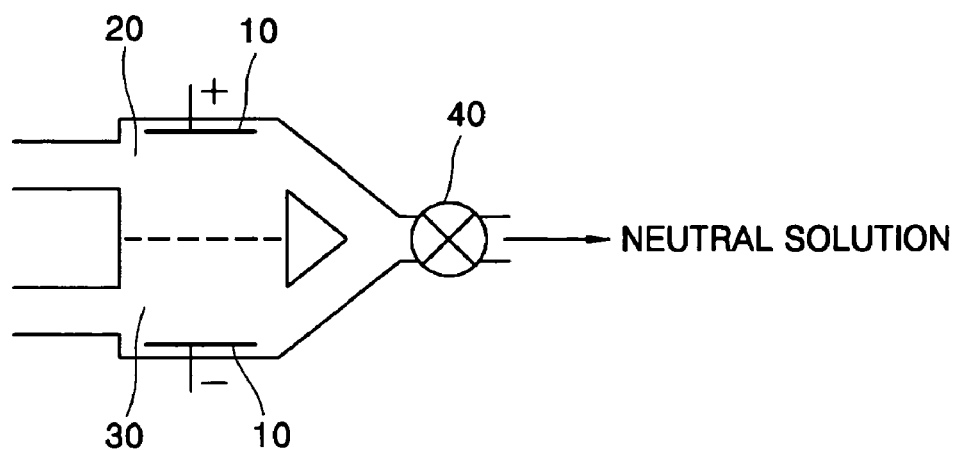
FIG. 2 illustrates an electrolysis device used in an example according to the present invention.
Figure 3:
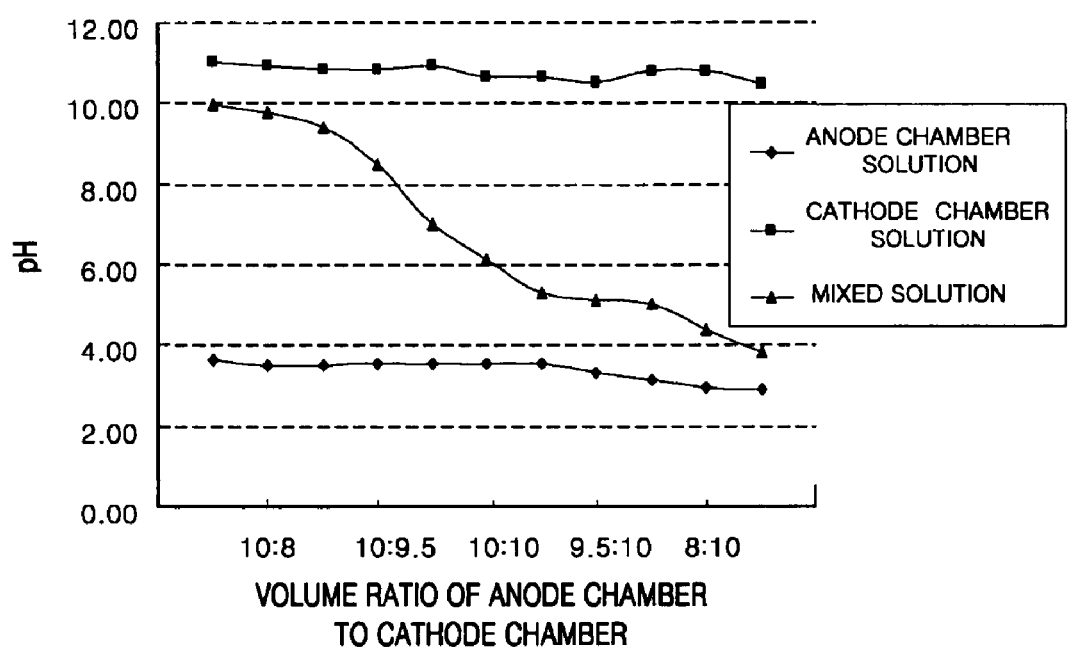
FIG. 3 is a graph of pH variations in an anode chamber solution, a cathode chamber solution, and a solution obtained by mixing equal volumes of the anode chamber solution and the cathode chamber solution when the volume ratio of an anode chamber and a cathode chamber of an electrolysis device that respectively produce the anode chamber solution and the cathode chamber solution through electrolysis is varied.

FIG. 2 illustrates a structure of the electrolysis device used in Example 1 according to the present invention. Referring to FIG. 2, a gold electrode and a platinum electrode are respectively installed in a cathode chamber and an anode chamber. The cathode chamber and the anode chamber are divided by a partition membrane Nafion™ (Dupont, U.S.A). In Example 1, electrolysis devices with the anode chamber 20 and the cathode chamber 30 in different volume ratios were manufactured, wherein the total volume of the anode chamber 20 and the cathode chamber 30 in each of the electrolysis devices was 10 mL. The anode chamber 20 was filled with 100 mM $Na_2SO_4$, and the cathode chamber 30 was filled with 100 mM NaCl. A 5V-DC voltage was supplied across the electrodes 10 for 1 minute to induce electrolysis. Electrolyzed solutions in the anode chamber 20 and the cathode chamber 30 were mixed using a pump 40 to obtain a mixed solution. The pump 40 is disposed in a microchannel formed by merging the outlet microchannel of the anode chamber and the outlet microchannel of the cathode chamber. The pH of the mixed solution was measured. The volume ratio of the anode chamber and the cathode chamber in each of the electrolysis devices used in Example 1, pH of each of anode and cathode chamber solutions, and pH of each of the mixed solutions are shown in Table 1. FIG. 3 is a graph obtained from the data of Table 1.

TABLE 1

| | anode chamber volume:cathode chamber volume | | | | | | | | | | |
| --- | --- | --- | --- | --- | --- | --- | --- | --- | --- | --- | --- |
| | 10:6 | 10:8 | 10:9 | 10:9.5 | 10:9.75 | 10:10 | 9.75:10 | 9.5:10 | 9:10 | 8:10 | 6:10 |
| pH of anode chamber solution | 3.64 | 3.52 | 3.53 | 3.56 | 3.54 | 3.54 | 3.57 | 3.31 | 3.14 | 2.96 | 2.90 |
| pH of cathode chamber solution | 11.05 | 10.96 | 10.86 | 10.84 | 10.92 | 10.68 | 10.65 | 10.53 | 10.82 | 10.80 | 10.47 |
| pH of mixed solution | 9.97 | 9.78 | 9.41 | 8.47 | 7.01 | 6.16 | 5.30 | 5.14 | 5.05 | 4.38 | 3.81 |

As is apparent from Table 1 and FIG. 3, by adjusting the volume ratio of the anode chamber and the cathode chamber and mixing the anode chamber solution and the cathode chamber solution obtained as a result of electrolysis in the same volume, the pH of the mixed solution can be controlled.

The resistance during electrolysis varies according to the concentration and the kind of a salt in a sample solution, and the concentration of ions generated as a result of the electrolysis varies. Therefore, in general, a process of adjusting the volume ratio of electrolyzed solutions while measuring the pH of a mixed solution to obtain a target pH and a device for adjusting the volume ratio of the electrolyzed solutions are required. In addition, when a biological sample solution containing NaCl, which is the highest concentration among components, is flowed into the anode and cathode chambers and electrolyzed therein, a chlorine gas is generated in the anode chamber as a result of the electrolysis of chlorine ions, not water. The concentration of hydrogen ions generated in the anode chamber is lower than the concentration of hydroxide ions generated in the cathode chamber. Furthermore, the hydrogen ions generated in the anode chamber are the product of a reaction between the chlorine gas and water. Therefore, the concentration of the hydrogen ions varies depending on the chlorine gas dissolution condition, and it is difficult to control the pH of the solution.

In the method of controlling pH according to the present invention, a target pH of a sample solution can be obtained by mixing the solutions obtained as a result of the electrolysis of a solution in the anode and cathode chambers in the same volume.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling the pH of a solution using electrolysis in a microfluidic device comprising an electrolysis device including an anode chamber having a first volume, a cathode chamber having a second volume, and a partition membrane between the anode chamber and the cathode chamber, wherein the anode chamber includes an inlet and an outlet through which an anode chamber solution enters and is discharged from the anode chamber, respectively, and an electrode, and the cathode chamber includes an inlet and an outlet through which a cathode chamber solution enters and is discharged from the cathode chamber, respectively, and an electrode, the method comprising:
   selecting the first volume and the second volume to have a predetermined ratio;
   flowing the anode chamber solution containing a compound having a lower standard oxidation potential than water into the anode chamber through the inlet of the anode chamber;
   flowing the cathode chamber solution containing a compound having a lower standard reduction potential than water into the cathode chamber through the inlet of the cathode chamber;
   applying voltage between the electrode in the anode chamber and the electrode in the cathode chamber to induce electrolysis in the anode chamber and the cathode chamber and to control a pH of the acidic anode-electrolyzed solution to have a first pH and to control a pH of the basic cathode-electrolyzed solution to have a second pH different from the first pH; and
   mixing equal volumes of the acidic anode-electrolyzed solution and the basic cathode-electrolyzed solution,
   wherein a target pH of a solution obtained by the mixing of the acidic anode-electrolyzed solution and the basic cathode-electrolyzed solution may be any pH determined according to the predetermined ratio of the first volume to the second volume.

2. The method of claim 1, wherein the compound having a lower standard oxidation potential than water is at least one ionic compound selected from the group consisting of $NO_3^-$, $F^-$, $SO_4^{2-}$, $PO_4^{3-}$, and $CO_3^{2-}$.

3. The method of claim 1, wherein the compound having a lower standard reduction potential than water is at least one ionic compound selected from the group consisting of $Na^+$, $K^+$, $Ca^{2+}$, $Mg^{2+}$, and $Al^{3+}$.

4. The method of claim 1, wherein the partition membrane passes current and blocks ions and gas generated through electrolysis in the anode chamber and the cathode chamber.

5. The method of claim 1, wherein each of the electrodes in the anode and cathode chambers is formed of a material selected from the group consisting of platinum, gold, copper, and palladium.

6. The method of claim 1, wherein the electrolysis device further comprises a pump installed in a microchannel formed by merging an outlet microchannel of the anode chamber and an outlet microchannel of the cathode chamber.

* * * * *